(12) United States Patent
Serdarevic

(10) Patent No.: US 9,627,970 B2
(45) Date of Patent: Apr. 18, 2017

(54) VOLTAGE CONVERTER AND METHOD FOR VOLTAGE CONVERSION

(71) Applicant: ams AG, Unterpremstaetten (AT)

(72) Inventor: Emir Serdarevic, Feldkirchen (AT)

(73) Assignee: AMS AG, Unterpremstaetten (AT)

( * ) Notice: Subject to any disclaimer, the term of this patent is extended or adjusted under 35 U.S.C. 154(b) by 197 days.

(21) Appl. No.: 14/558,660

(22) Filed: Dec. 2, 2014

(65) Prior Publication Data

US 2015/0155781 A1    Jun. 4, 2015

(30) Foreign Application Priority Data

Dec. 3, 2013 (EP) .................................... 13195517

(51) Int. Cl.
*H02M 3/158* (2006.01)

(52) U.S. Cl.
CPC ......... *H02M 3/158* (2013.01); *H02M 3/1588* (2013.01); *Y02B 70/1466* (2013.01)

(58) Field of Classification Search
CPC ............. H02M 3/1588; H02M 3/1582; H02M 3/1584; H02M 2001/0045; H02M 1/38; H02M 1/4233; H02M 2001/0032; H02M 3/156; H02M 3/158; Y02B 70/1466; Y02B 70/126; Y02B 70/16; Y02B 70/1425
See application file for complete search history.

(56) References Cited

U.S. PATENT DOCUMENTS

| | | |
|---|---|---|
| 5,929,690 A | 7/1999 | Williams |
| 7,531,994 B2* | 5/2009 | Itoh ........................... G05F 1/56 323/273 |
| 8,018,212 B1* | 9/2011 | Petricek .............. H02M 3/1582 323/259 |
| 8,294,436 B2 | 10/2012 | Serdarevic |
| 2003/0206425 A1 | 11/2003 | Zhang |

(Continued)

OTHER PUBLICATIONS

AS1335 Datasheet—"1.5A, 1.5MHz, Synchronous DC/DC Step-Down Converter" www.austriamicrosystems.com/DC-DC_Step-Down/AS1335 <http://www.austriamicrosystems.com/DC-DC_Step-Down/AS1335>, Revision 1.03, pp. 1-18, 2007.

(Continued)

*Primary Examiner* — Adolf Berhane
*Assistant Examiner* — Henry Lee, III
(74) *Attorney, Agent, or Firm* — McDermott Will & Emery LLP

(57) ABSTRACT

A voltage converter (10) comprises a converter input (11), a coil (13) with a first and a second coil terminal (14, 14'), a first switch (15) arranged between the first coil terminal (14) and a reference potential terminal (16), a second switch (17) arranged between the converter input (11) and the first coil terminal (14), a converter output (12) coupled to the second coil terminal (14') and a control unit (18). The control unit (18) is configured to set the first switch (15) into a blocking state in a first phase (A) of an operating mode of the voltage converter (10) and into a diode mode in a second phase (B) of the operating mode of the voltage converter (10) and to set the second switch (17) into a conducting state in the first phase (A) and into a blocking state in the second phase (B).

12 Claims, 4 Drawing Sheets

(56) References Cited

U.S. PATENT DOCUMENTS

| | | | |
|---|---|---|---|
| 2009/0027020 A1* | 1/2009 | Qiu et al. | H02M 3/1588 |
| | | | 323/282 |
| 2009/0206772 A1 | 8/2009 | Bayer et al. | |
| 2009/0273391 A1 | 11/2009 | Tseng et al. | |
| 2012/0229111 A1 | 9/2012 | Serdarevic | |

OTHER PUBLICATIONS

AS1337 Datasheet—"200mA, DC-DC Step-Up Converter with Buck Mode" www.austrianmicrosystems.com/DC-DC_Step-UP/AS1337, Revision 1.05, pp. 1-15, 1997.

LM3242 Datasheet—"6mhZ, 750Ma Miniature, Adjustable, Step-Down DC-DC Converter with Auto Bypass for RF Power Amplifiers"; Texas Instruments; SNOSB48D, Oct. 2011, Revised Mar. 2011-3, pp. 1-22.

LTC3403 Datasheet—"1.5MHz, 600mA Synchronous Step-Down Regulator with Bypass Transistor"; Linear Technology Corporation, 2003, pp. 1-16.

MAX8989 Datasheet—"Multimode PA Step-Down Converter with Linear Bypass Mode"; Maxim Integrated, 19-5489, Rev. 1,2011, pp. 1-16.

Persson, Eric, "How FET selection can optimize synchronous buck converter efficiency", EE Times, May 7, 2006, www.eetimes.com/document.asp?doc_id+1273110&print=yes (retrieved Aug. 4, 2014), pp. 1-4.

\* cited by examiner

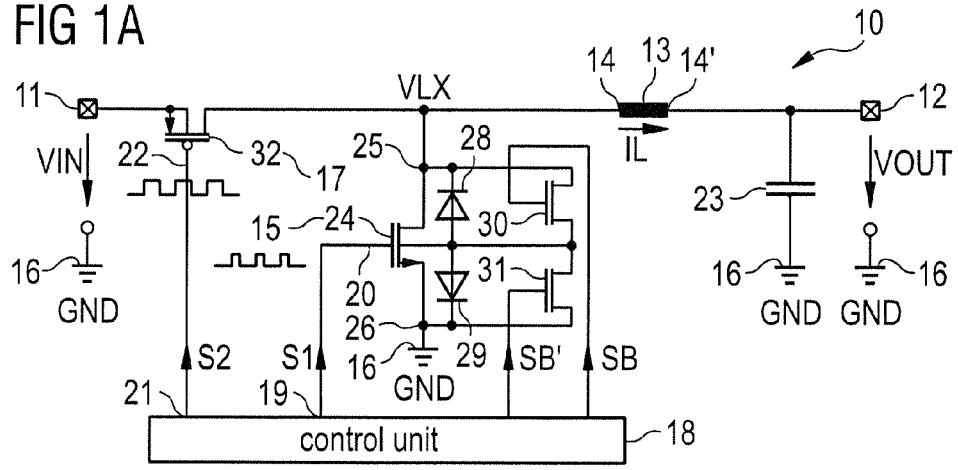
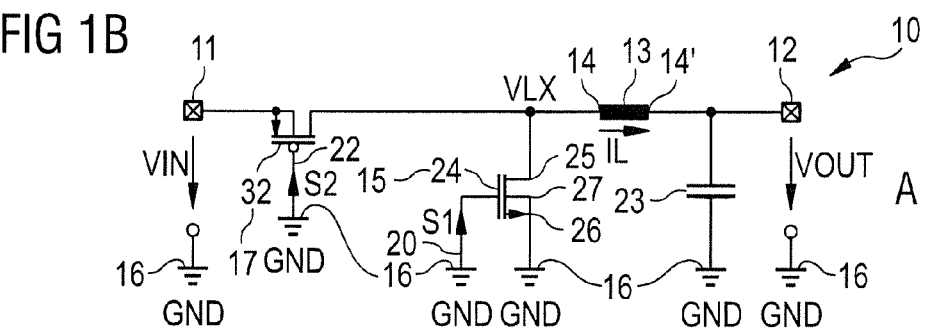
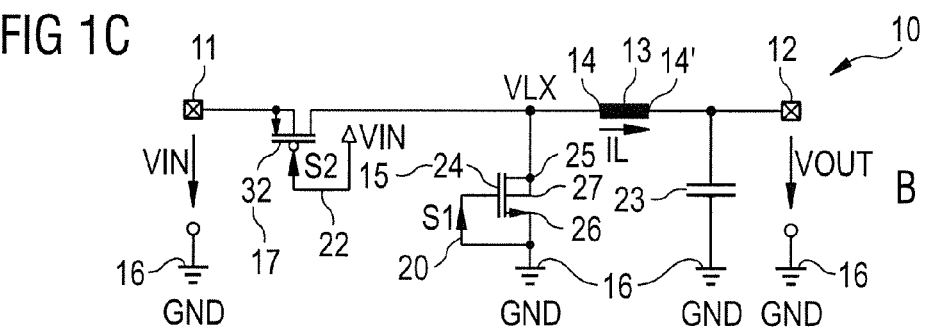
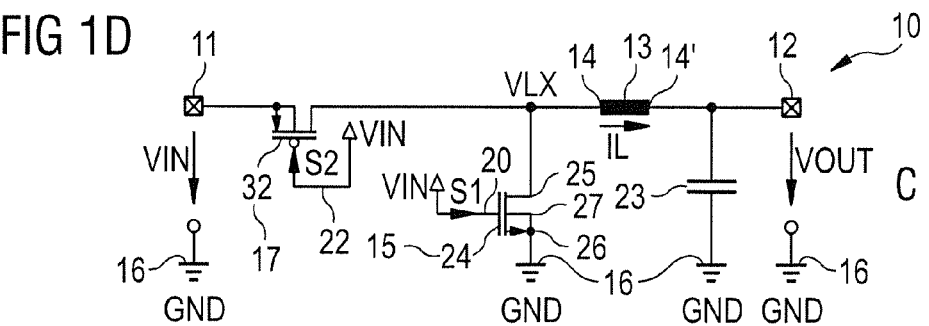

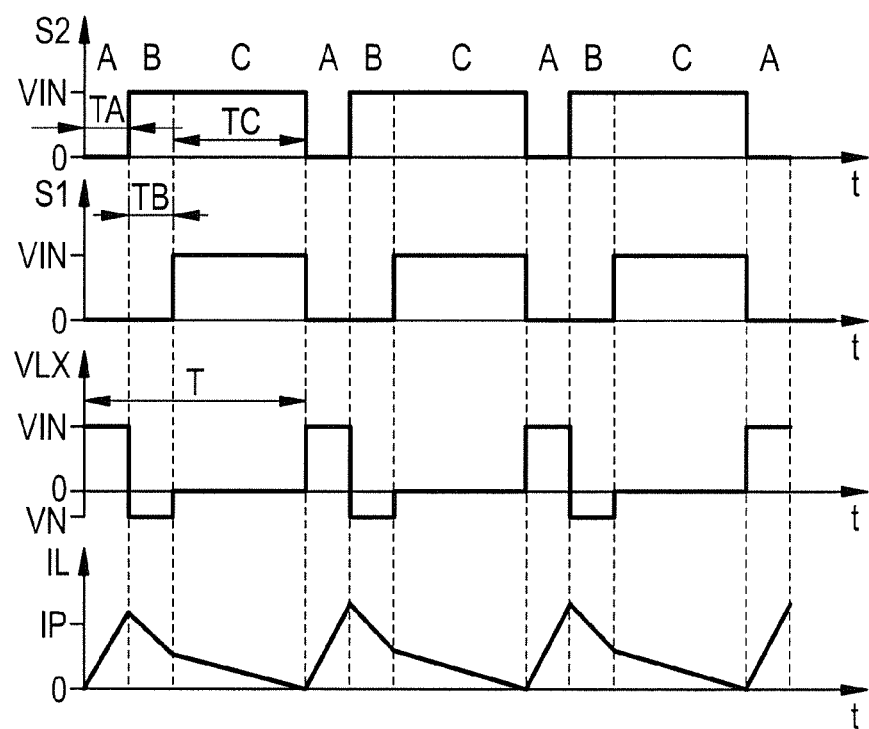

VOLTAGE CONVERTER AND METHOD FOR VOLTAGE CONVERSION

CROSS-REFERENCE TO RELATED APPLICATION

This application claims the benefit of European Patent Application No. 13195517.1, filed on Dec. 3, 2013, the disclosure of which is incorporated herein by reference.

FIELD OF THE INVENTION

The invention relates to a voltage converter and to a method for voltage conversion.

BACKGROUND OF THE INVENTION

Voltage converters are often designed as step-up converters or step-down converters. If a voltage converter is connected on its input side to a battery, whose voltage is larger than a voltage needed by a load, then a step-down conversion is carried out. A step-down converter can also be called a buck-converter.

A typical step-down converter comprises a first switch, a second switch and a coil. A first coil terminal of the coil is coupled via the first switch to a reference potential terminal. The battery is coupled via the second switch to the first coil terminal. A second terminal of the coil is connected to a converter output of the voltage converter. In a first phase, the first switch is in a blocking state and the second switch is in a conducting state providing an input voltage to the coil. Thus, an output voltage can be tapped at the second coil terminal of the coil. In a second phase, the first switch is in a conducting state and the second switch is in a blocking state. In the second phase, current flows from the reference potential terminal via the first switch and the coil to the converter output.

In the first phase, a coil current flowing through the coil increases. Thus, the coil will be charged. In the second phase, the coil current decreases. Thus, the coil will be discharged. A step-down converter may have a limitation in its functionality if a transformation between the input voltage and the output voltage is too large or too small. This especially occurs if the output voltage or a predetermined value of the output voltage is very low. In that case, stability cannot easily be realized.

Document U.S. Pat. No. 8,294,436 B2 relates to a DC/DC converter which is able to perform an up-conversion and a down-conversion.

Data sheet "AS1335-1.5A, 1.5 MHz, Synchronous DC/DC Step-Down Converter", ams AG, Austria, Revision 1.03 describes a buck converter achieving a minimum output voltage of 0.6 V.

Document US 2009/0273391 A1 refers to a regulated voltage generator.

SUMMARY OF THE INVENTION

In an embodiment, a voltage converter comprises a converter input, a coil with a first and a second coil terminal, a first and a second switch as well as a converter output. The first switch is arranged between the first coil terminal and a reference potential terminal. The second switch is arranged between the converter input and the first coil terminal. The second coil terminal is coupled to the converter output. Moreover, the voltage converter comprises a control unit that is connected to a control terminal of the first switch and to a control terminal of the second switch. The control unit is configured to set the first switch into a blocking state in a first phase of an operating mode of the voltage converter and into a diode mode in a second phase of the operating mode of the voltage converter. Moreover, the control unit is configured to set the second switch into a conducting state in the first phase and into a blocking state in the second phase. An input voltage is received at the converter input. An output voltage is provided at the converter output.

Advantageously, in the first phase current flows from the converter input to the coil via the second switch. This results in a charging of the coil by a coil current. In the second phase, the coil current can flow from the reference potential terminal to the coil via the first switch. Thus, the coil current can flow to the converter output in the first phase as well as in the second phase. Since the first switch is in the diode mode in the second phase, the coil current decreases very quickly in the second phase. This reduces the amount of energy provided to the converter output. Since said amount of energy is limited, small values of the output voltage can be achieved.

In an embodiment, the voltage converter and a method for voltage conversion is suitable for generating low values of the output voltage.

In an embodiment, the second phase follows the first phase. The first phase and the second phase are repeated periodically. Thus, a further first phase follows the second phase and a further second phase follows the further first phase and so on.

In an embodiment, the first and the second phase are periodically repeated with a cycle time. The first and the second phase alternate with one another within the cycle time. The cycle time is a sum of a first duration of the first phase and of a second duration of the second phase. The cycle time may be constant. Such a cycle may be used for high values of the input voltage. By periodically switching of the first phase to the second phase and back, a high transmission factor between the input voltage and the output voltage may be achieved.

In an embodiment, the control unit comprises a clock input to which a clock signal having the cycle time is fed. Moreover, the voltage converter may comprise an oscillator that is coupled to the clock input of the control unit. The oscillator generates the clock signal. A frequency of the clock signal is constant, thus, the cycle time is constant. The cycle time is equal to a clock period that is determined by the clock signal. The voltage conversion is advantageously performed at a fixed frequency. Therefore, other circuitry components can be configured so that they are not influenced by the frequency of the voltage converter.

In an alternative embodiment, the voltage converter uses a hysteretic regulation. Thus, the sum of the first duration of the first phase and of the second duration of the second phase is not constant. The voltage converter may be free of an oscillator. The operating mode of the voltage converter does not use a clock signal and a constant cycle time.

In an embodiment, the first switch is implemented as a first field-effect transistor, abbreviated to FET. The first FET comprises a first output terminal, a second output terminal and a control terminal that is connected to the control terminal of the first switch. A controlled section of the first FET is arranged between the first output terminal and the second output terminal. The first and the second output terminal may be implemented as a source terminal, respectively a drain terminal of the first FET. The controlled section of the first FET can be realized as a channel of the first FET. The first switch is set in the diode mode by setting the first FET in the diode mode.

In an embodiment, the controlled section of the first FET is weakly conducting, if the first switch is adjusted in the diode mode. Advantageously, the controlled section obtains a high on-resistance in the diode mode. Thus, a decrease of the coil current is achieved in the second phase.

In an embodiment, the second switch is implemented as a second field-effect transistor, abbreviated to FET. The second FET comprises a first output terminal, a second output terminal and a control terminal that is connected to the control terminal of the second switch. A controlled section of the second FET is arranged between the first output terminal and the second output terminal. The first and the second output terminal may be implemented as a source terminal, respectively a drain terminal of the second FET.

In an embodiment, the first and the second FET may be fabricated as metal-oxide-semiconductor FETs. The first and the second FET may be implemented as enhancement FETs.

The first FET may be realized as an n-channel FET. The second FET may be implemented as a p-channel FET.

In a further development, a current flows between the first output terminal and the second output terminal of the first FET, when the first switch is set in the diode mode. Thus, the coil current flows from the reference potential terminal through the second output terminal of the first FET, the controlled section of the first FET, the first output terminal of the first FET and the coil to the converter output. In the second phase, the coil current flowing from the reference potential terminal to the converter output has a positive value. In the first phase, the coil current flowing from the converter input via the second switch and the coil to the converter output also has a positive value.

In an embodiment, the voltage converter comprises a semiconductor body. The first and the second FET as well as the control unit are arranged on a first main area of the semiconductor body. The first and the second FET as well as the control unit are implemented in complementary metal-oxide-semiconductor technology, abbreviated to CMOS technology. The semiconductor body comprises a substrate. The first FET may be arranged in the substrate. Alternatively, the first FET may be arranged in a well which is located in the substrate. The substrate or the well is electrically contacted by a bulk terminal also called bulk contact or substrate contact.

The coil may be realized as an external coil that is coupled to the semiconductor body. The voltage converter may be implemented by the coil and exactly one semiconductor body to which the coil is connected. The coil may be named as inductor.

In an embodiment, current flowing through a body diode of the first FET contributes to the current flowing through the first FET and thus to the coil current. In general, a FET comprises two body diodes. The body diodes are a diode between the bulk terminal and the first output terminal and a diode between the bulk terminal and the second output terminal of the FET. The body diodes are pn-junctions. Thus, current flows from the bulk terminal through an output terminal of the first FET to the coil in the second phase.

In an embodiment, no current flows through the bulk terminal. A current through one of the body diodes does not contribute to the coil current. Charge carriers in a channel of the first FET exclusively form the current flowing through the first FET and thus form the coil current in the second phase. The current flowing through the first switch, and thus the coil current, is free from a contribution of the body diodes of the first FET.

In an embodiment, the control unit provides a ground potential to the control terminal of the first FET in the second phase. The ground potential is tapped at the reference potential terminal.

Advantageously, by providing the ground potential to the control terminal of the first FET the controlled section of the first FET is only weakly conducting in the second phase. At the end of the first phase the coil current obtains a peak value. Since the second FET is adjusted in a blocking state at the start of the second phase, the coil current cannot continue to flow through the second switch. A conduction line from the first switch to the first coil terminal and a conduction line of the second switch to the first coil terminal have parasitic capacitances. Due to the physical characteristics of the coil, the coil current cannot be immediately stopped. Thus, the coil current continues to flow at the transition from the first phase to the second phase and discharges the parasitic capacitances. Thus, the voltage at a node between the first switch and the first coil terminal quickly decreases. The voltage at said node becomes negative at the start of the second phase. A gate-source voltage of the first FET is a voltage between the control terminal of the first FET and said node. When the gate-source voltage of the first FET becomes larger than a threshold voltage of the first FET, the controlled section of the first FET starts to conduct current. Thus, an on-resistance of the controlled section of the first FET is set to a value that allows that the coil current is able to flow through the first FET. Since the controlled section of the first FET is only weakly conducting, the coil current quickly decreases from the peak value to zero in the second phase.

In an alternative embodiment, a reference voltage is provided to the control terminal of the second FET in the second phase. The control unit may comprise a reference voltage source that generates the reference voltage. The reference voltage may be less than the input voltage. The reference voltage may have a value between 0 Volt and the threshold value of the first FET. Thus, the first FET starts conducting when the difference between the reference voltage and the voltage at the node between the first FET and the first coil terminal is larger than the threshold value. The reference voltage has a positive value. Thus, the first FET starts conducting more quickly in comparison to the embodiment in which the control terminal of the first FET is connected to the reference potential terminal in the second phase.

In an embodiment, the first FET is driven in its saturation region if the first FET reaches the diode mode. Thus, the gate-source voltage of the first FET approximately equals a sum of its threshold voltage and its overdrive voltage. The overdrive voltage of a FET is defined as the voltage between a transistor's gate and source terminals in excess of the threshold voltage. The threshold voltage is defined as a minimum voltage required between the control terminal and the source terminal at which the controlled section of the FET starts conducting. The overdrive voltage is also known as an excess gate voltage or effective voltage. The overdrive voltage amounts to the difference between the gate-source voltage and the threshold voltage of a FET.

In an embodiment, the control unit detects a minimum voltage within the voltage converter and applies said minimum voltage to the bulk terminal of the first FET. Thus, no current flows through one of the body diodes of the first FET.

In an embodiment, the control unit comprises a further FET that is arranged between the bulk terminal of the first FET and a node between the first coil terminal and the first switch. The further FET is controlled such that the further FET is in a conducting state in the second phase and in a blocking state in the first phase.

In a further development, the control unit comprises an additional FET that is arranged between the bulk terminal of the first FET and the reference potential terminal. The additional FET is controlled such that the additional FET reaches a conducting state in the first phase and a blocking state in the second phase.

Advantageously, the bulk terminal of the first FET obtains the lowest voltage value of the voltage converter in both phases by the appropriate switching of the further and the additional FET. In the first phase, the ground potential that is tapped at the reference potential terminal is the lowest voltage value of the voltage converter and in the second phase a coil input voltage that is tapped at the node between the first FET and the coil is negative and, thus, has the lowest value of the voltage converter. Since the lowest available voltage of the voltage converter is applied to the bulk terminal of the first FET, the body diodes of the first FET are both set in a blocking state. Thus, the occurrence of a body diode current is avoided.

In an embodiment, the current flow through the body diode is avoided by providing an appropriate voltage to the body of the first FET via the further and the additional FET. Advantageously, a current flowing through the channel of the first FET may generate smaller losses in comparison to a current flowing through one of the body diodes. Smaller losses result in a lower rise of the temperature of the first FET. The first FET may obtain a longer life time and a lower risk for damage.

In a further development, the operating mode of the voltage converter comprises not only the first phase and the second phase, but also a third phase. The control unit sets the first switch into a conducting state in the third phase and sets the second switch into a blocking state in the third phase. Thus, the second switch is in a blocking state in the second and the third phase. The first switch has a first value of the on-resistance in the second phase and a second value of the on-resistance in the third phase, wherein the second value is smaller than the first value. Thus, the voltage converter realizes a multiphase buck conversion having a stable operation. The second and the third phase can be summed up as a coil discharging phase.

In an embodiment, the third phase follows the second phase which follows the first phase. The first, the second and the third phase may be periodically repeated with the cycle time.

In an alternative embodiment, the second phase follows the third phase that follows the first phase. The first, the third and the second phase may be periodically repeated with the cycle time.

In an embodiment, the cycle time is a sum of the first duration of the first phase, of the second duration of the second phase and of a third duration of the third phase. The cycle time is constant.

In an embodiment, the first duration of the first phase is adjusted as a function of a difference between the output voltage and a predetermined value of the output voltage.

The first duration of the first phase may depend on a current drawn by a load coupled to the converter output.

In an alternative embodiment, a cycle having the cycle time comprises also a further third phase. The first and second switch are set in the further third phase correspondingly to the third phase. The further third phase follows the second phase that follows the third phase that follows the first phase. The first phase, the third phase, the second phase and the further third phase may be repeated periodically with the cycle time. By selecting the durations of the further third phase, the second phase and the third phase, the on-resistance of the first FET can advantageously be modulated and thus the decrease of the coil current can be adjusted to achieve a predetermined behavior of the voltage converter.

In an embodiment, a cycle comprises several second phases and several third phases that alternate with one another. The sum of the durations of the second phases in one cycle time is referred to as the second duration. Accordingly, the third duration is defined as the sum of the durations of the third phases during one cycle time.

The voltage converter may be implemented as a DC/DC converter. The voltage converter may be realized in a non-inverting manner.

In an embodiment, the control unit is configured not to set the first switch and the second switch in a conducting state simultaneously.

In an embodiment, a method for voltage conversion is performed by a voltage converter. The voltage converter comprises a converter input, a converter output, a coil with a first and a second coil terminal, a first switch arranged between the first coil terminal and a reference potential terminal and a second switch arranged between the converter input and the first coil terminal. The method comprises receiving an input voltage at the converter input, adjusting the first switch into a blocking state in a first phase of an operating mode of the voltage converter and into a diode mode in a second phase of the operating mode of the voltage converter and adjusting the second switch into a conducting state in the first phase and into a blocking state in the second phase. An output voltage is provided at the converter output coupled to the second coil terminal.

The first switch has a high on-resistance in the second phase. Thus, the energy transfer from the coil to the converter output can be reduced and a low value of the output voltage can be achieved. A coil current flowing through the coil may increase in the first phase and decrease in the second phase.

In an embodiment, the voltage converter performs a step-down conversion of the input voltage into the output voltage in the operating mode of the voltage converter.

In an embodiment, the voltage converter also has an idle mode which is different from the operating mode. The first and the second switch is in a blocking state in the idle mode. In the idle mode, no voltage conversion is performed by the voltage converter.

In an embodiment, the voltage converter also has a feed-through mode that differs from the operating mode and the idle mode described above. In the feed-through mode, the first switch is permanently in a blocking state and the second switch is permanently in a conducting state. A duty cycle equal to 1 is achieved in the feed-through mode. No switching occurs in the feed-through mode, resulting in the output voltage being equal to the input voltage.

A phase may refer to a duration during which each of the two switches is driven in a defined state, for example in a blocking state, a conducting state or in the diode mode. The blocking state of one of the switches can also be called a non-conducting state or off-state. The conducting state of one of the switches can also be called an on-state.

In an embodiment, a flow of the coil current from the first coil terminal to the converter output is enabled in the first and the second phase. Said current either flows from the converter input or from the reference potential terminal via the coil to the converter output. The value of the output voltage can increase in the first phase. Due to the high on-resistance of the first switch during the second phase and the resulting decreasing value of the coil current during the second phase, a value of the output voltage can be prevented from becoming too large during the first and second phases.

BRIEF DESCRIPTION OF THE DRAWINGS

The invention will be described in detail below for several exemplary embodiments with reference to the figures. Components and circuit parts that are functionally identical or have the identical effect bear identical reference numbers. Insofar as components or circuit parts correspond to one another in function, a description of them will not be repeated in each of the following figures. Therein:

FIGS. 1A to 1D show an exemplary embodiment of a voltage converter and exemplary equivalent circuits of the voltage converter during different phases;

FIGS. 2A to 2C show exemplary embodiments of signal-time diagrams of signals of the voltage converter.

DETAILED DESCRIPTION OF THE DRAWINGS

Figure 2A:
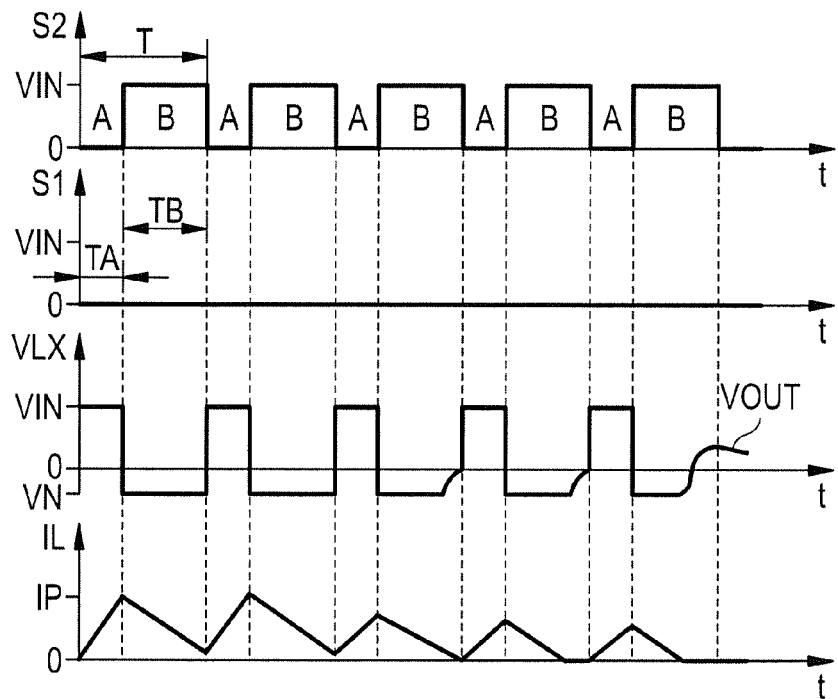

FIG. 1A shows an exemplary embodiment of a voltage converter 10 that comprises a converter input 11, a converter output 12 and a coil 13 having a first coil terminal 14 and a second coil terminal 14'. The voltage converter 10 comprises a first switch 15 that couples the first coil terminal 14 to a reference potential terminal 16. Moreover, the voltage converter 10 comprises a second switch 17 that couples the converter input 11 to the first coil terminal 14. The voltage converter 10 comprises a control unit 18 having a first output 19 coupled to a control terminal 20 of the first switch 15 and a second output 21 coupled to a control terminal 22 of the second switch 17. A capacitor 23 of the voltage converter 10 couples the converter output 12 to the reference potential terminal 16. The converter output 12 is coupled to the second coil terminal 14'. The coil 13 can be realized as inductor.

The first switch 15 is implemented as a first field-effect transistor 24, abbreviated to FET. The first FET 24 comprises a control terminal that is connected to the control terminal 20 of the first switch 15 and also comprises a first and a second output terminal 25, 26. The first output terminal 25 is connected to the first coil terminal 14. The second output terminal 26 is connected to the reference potential terminal 16. A controlled section of the first FET 24 is arranged between the first and the second output terminal 25, 26 and, thus, between the first coil terminal 14 and the reference potential terminal 16. Furthermore, the first FET 24 comprises a bulk terminal 27. The first FET 24 is realized as an n-channel FET. The first and the second output terminal 25, 26 can also be named source terminal and drain terminal, respectively. The first FET 24 comprises a first and a second diode 28, 29. The first diode 28 connects the bulk terminal 27 to the first output terminal 25. The second diode 29 is located between the bulk terminal 27 and the second output terminal 26. The first and the second diode 28, 29 are body diodes of the first FET 24, namely a substrate-source diode, respectively a substrate-drain diode of the first FET 24. Thus, the first and the second diode 28, 29 are fabricated during the fabrication of the first FET 24. The first and second diodes 28, 29 are not realized as discrete elements but are parts of the first FET 24. Moreover, the voltage converter 10 comprises a further FET 30 that couples the bulk terminal 27 of the first FET 24 to the first output terminal 25 of the first FET 24. Thus, a controlled section of the further FET 30 is connected between the bulk terminal 27 and the first output terminal 25. In addition, the voltage converter 10 comprises an additional FET 31 that couples the bulk terminal 27 of the first FET 24 to the second output terminal 26 of the first FET 24. Thus, a controlled section of the additional FET 31 is arranged between the bulk terminal 27 and the second output terminal 26. The control unit 18 is coupled via two control outputs to the control terminal of the further FET 30 and to the control terminal of the additional FET 31.

The second switch 17 is implemented as a second FET 32. A controlled section of the second FET 32 is arranged between the converter input 11 and the first coil terminal 14. The control terminal of the second FET 32 is connected to the control terminal 22 of the second switch 17. The second FET 32 is implemented as a p-channel FET. A bulk terminal of the second FET 32 is connected to the converter input 11. The first and the second FET 24, 32 are fabricated as enhancement FETs. The first and the second FET 24, 32 are realized as power transistors. The first and the second FET 24, 32 are designed as metal-oxide-semiconductor field-effect transistors, abbreviated to MOSFET.

An input voltage VIN is provided to the converter input 11. The input voltage VIN is applied between the converter input 11 and the reference potential terminal 16. The voltage converter 10 generates an output voltage VOUT by the input voltage VIN using an operating mode. The output voltage VOUT is tapped between the converter output 12 and the reference potential terminal 16. The capacitor 23 is foreseen for smoothing the output voltage VOUT. The control unit 18 generates a first control signal S1 applied to the control terminal 20 of the first switch 15 and, thus, to the control terminal of the first FET 24. In addition, the control unit 18 generates a second control signal S2 that is provided to the control terminal 22 of the second switch 17 and, thus, to the control terminal of the second FET 32. The control unit 18 applies a bulk control signal SB to the control terminal of the further FET 30 and an additional bulk control signal SB' to the control terminal of the additional FET 31. A ground potential GND is applied at the reference potential terminal 16. The ground potential GND is equal to 0 Volt. A coil input voltage VLX can be tapped at the first coil terminal 14 and can be also tapped at a node between the first switch 15 and the coil 13. A coil current IL flows through the coil 13.

In an alternative embodiment, not shown, the first FET 24 is realized as a p-channel FET.

In an alternative embodiment, not shown, the second FET 32 is realized as an n-channel FET. The voltage converter 10 may comprise a charge pump for generating the second control signal S2. Thus, an on-resistance of the second switch 17 is reduced as a result of the higher mobility of electrons in comparison to holes.

The first and second control signals S1, S2 have voltages matched to the conductivity types of both FETs 24, 32.

In an alternative embodiment, not shown, the first and the second diode 28, 29 is realized as discrete elements. They are not parts of the first FET 24.

FIGS. 1B to 1D show equivalent circuits of the voltage converter 10. Whereas FIG. 1B illustrates the voltage converter 10 in a first phase A, FIGS. 1C and 1D elucidate the voltage converter 10 in a second and a third phase B, C.

In the first phase A as shown in FIG. 1B, the first control signal S1 has the value of 0 V that is equal to the ground potential GND. Thus, the control terminal 20 of the first switch 15 and, therefore, the control terminal of the first FET 24 is connected to the reference potential terminal 16. The first control signal S1 sets the first FET 24 and thus the first switch 15 in a blocking state in the first phase A.

In the first phase A, the second control signal S2 also obtains the value of 0 V. Thus, the second control signal S2 is the ground potential GND. The control terminal 22 of the second switch 17, and consequently the control terminal of the second FET 32, is connected to the reference potential terminal 16 in the first phase A. In the first phase A, the second control signal S2 sets the second FET 32 in a conducting state. Thus, the second switch 17 is conducting current from the converter input 11 to the first coil terminal 14. The first phase A is designed for charging of the coil 13.

As illustrated in FIG. 1C, in the second phase B, the first control signal S1 obtains 0 V, that is the ground potential GND. Thus, the control terminal 20 of the first switch 15 and the control terminal of the first FET 24 is connected to the reference potential terminal 16 in the second phase B. The first FET 24, and thus also the first switch 15, is set in a diode mode in the second phase B. Since the control terminal of the first FET 24 is directly connected to the second output terminal 26 of the first FET 24, the first FET 24 can be seen as a diode having only two terminals, namely the first and the second output terminal 25, 26 in the second phase B. The control terminal of the first FET 24 is short-circuited to the second output terminal 26 of the first FET 24 in the second phase B.

In the diode mode, the first FET 24 only allows a positive current flow from the reference potential terminal 16 to the coil 13. A positive current flow from the coil 13 to the reference potential terminal 16 is excluded, when the first FET 24 is in the diode mode. Thus, the first FET 24 shows the behavior of a diode in the diode mode.

In the second phase B, the second control signal S2 obtains the value of the input voltage VIN. Thus, the control terminal 22 of the second switch 17, and consequently the control terminal of the second FET 32, is connected to the converter input 11 in the second phase B. The second FET 32, and consequently the second switch 17, is in a blocking state in the second phase B. Thus, the first FET 24 is for some time connected like a diode during the second phase B, where the coil 13 is discharging.

During the diode phase, the control terminal of the first FET 24 is connected to the ground potential GND or alternatively to a reference voltage. The bulk 27 of the first FET 24 is connected to the first coil terminal 14 or, alternatively, to a further reference voltage. A voltage at the bulk terminal 27 of the first FET 24 may be the most negative voltage in the voltage converter 10. The further reference voltage reaches a negative value. The second phase B is designed for discharging of the coil 13

As shown in FIG. 1D, the first control signal S1 reaches the value of the input voltage VIN resulting in a conducting first FET 24 and thus in a conducting first switch 15 in the third phase C. The second control signal S2 also reaches the value of the input voltage VIN setting the second FET 32 and, consequently the second switch 17, into a blocking state in the third phase C. The control terminals of the first and the second FET 24, 32, and thus the control terminals of the first and the second switch 15, 17, are connected to the converter input 11 in the third phase C. The third phase C is also designed for discharging of the coil 13.

The further FET 30 is in a conducting state in the second phase B and in a blocking state in the first and the third phase A, C. The additional FET 31 is in a blocking state in the second phase B and in a conducting state in the first and the third phase A, C. Thus, the diode phase of the first FET 24 can be combined with a conducting state of the first FET 24.

FIG. 2A shows an embodiment of a timing of the signals of the voltage converter 10 of FIGS. 1A to 1D. FIG. 2A illustrates the timing of the first and the second control signal S1, S2, the coil input voltage VLX and the coil current IL. According to FIG. 2A, the first phase A and the second phase B are alternating. The first phase A and the second phase B are repeated with a cycle time T. As already described above, the first and the second control signal S1, S2 obtain the ground potential GND in the first phase A. Since the second switch 17 is in a conducting state and the first switch 15 is in a blocking state, the coil input voltage VLX obtains the value of the input voltage VIN in the first phase A. The voltage converter 10 performs a down conversion in the operating mode of the voltage converter 10. Thus, the input voltage VIN is larger than the output voltage VOUT. A positive coil current IL flows during the first phase A. The coil current IL rises during the first phase A to a peak value IP.

In the second phase B, the first control signal S1 continues to have the value of the ground potential GND, whereas the second control signal S2 is now set on the value of the input voltage VIN. The second switch 17 is in a blocking state.

In general, a current flowing through a coil cannot make jumps. The coil current IL continues to flow at a transition of the first phase A to the second phase B. Since the second switch 17 is set in a blocking state, the coil current IL now discharges the parasitic capacitances between the coil 13 and the first switch 15 and between the coil 13 and the second switch 17. The coil input voltage VLX decreases from the value of the input voltage VIN to a negative voltage VN. Since the coil input voltage VLX has a smaller value than the ground potential GND, the first output terminal 25 is the source terminal of the first FET 24 in the second phase B. The first FET 24 starts conducting when the difference between the voltage of the first control signal S1 and the voltage at the first output terminal 25 is larger than a threshold value of the first FET 24. The coil input VLX obtains such a negative value VN that an overdrive voltage is achieved at the first FET 24 resulting in an appropriate conductivity of the first FET 24. Thus, the coil current IL flows through the first FET 24 and thus through the first switch 15 in the second phase B.

Thus, the coil current IL flows from the reference potential terminal 16 via the second output terminal 24 of the first FET 24, the controlled section of the first FET 24, the first output terminal 25 of the first FET 24 and the coil 13 to the converter output 12. The coil current IL decreases in the second phase B. The coil current IL drops from the peak value IP to zero in the second phase B. Five cycles are shown in FIG. 2A. In case the output voltage VOUT rises during the five cycles, a peak value IP' of the fifth cycle is smaller than the peak value IP of the first cycle. Therefore, the coil current IL becomes zero before the end of the second phase B of the fifth cycle. At the end of the second phase B, the coil input voltage VLX rises to the value of the output voltage VOUT, since a very small coil current IL flows in the reverse direction and charges the parasitic capacitances between the coil 13 and the first and the second switches 15, 17. Thus, the first FET 24 is set in a blocking state at the end of the second phase B, if the output voltage VOUT has risen to a high value.

The cycle time T is the sum of a first duration TA of the first phase A and of a second duration TB of the second phase B. A duty cycle D can be calculated according to the following equation:

$$D = \frac{TA}{T} \text{ with } T = TA + TB = \frac{1}{fOSC},$$

wherein T is the cycle time, TA is a value of the first duration of the first phase A, TB is a value of the second duration of the second phase B and fOSC is a frequency of a clock signal, not shown, having the cycle time T as the period.

In an alternative embodiment, the energy consumed by a load that is connected to the converter output 12 during the cycle time T is as large as the energy provided via the voltage converter 10 to the converter output 12 in the cycle time T. Consequently, the coil current IL reaches the same peak value IP in each of the cycles and the coil input voltage VLX is nearly constant at the negative value VN during each of the second phases B.

A transformation factor F of the voltage converter 10 can be defined as F=VIN/VOUT. The voltage converter 10 implemented as buck converter has an improved functionality, for example for high or small transformation factors F. This especially occurs, when the output voltage VOUT is very low. A transformation factor F of more than 7 or 10 may be stably realized. Advantageously, the voltage converter 10 offers a low output voltage VOUT, because one trend is more toward a need for low power. The small output voltage VOUT may be reached in all corners and for all load conditions. The voltage converter 10 is free of a low external reference voltage, for example generated by a digital-to-analog converter, abbreviated to DAC. The voltage converter 10 may be fabricated in a not-complicated and not-expensive manner. In an embodiment, the voltage converter 10 does not need an extra pin for contacting an external reference source and does not need a reference voltage from an external DAC. The buck DC/DC converter 10 has a simple structure and can be designed in a very easy and efficient way. The second phase B in which the first FET 24 conducts as diode can be realized in a structure designed for buck conversion.

The duty cycle D as defined above is approximately equal or higher than a ratio of the output voltage VOUT to the input voltage VIN and, thus, an inverse of the transformation factor F:

$$D \geq \frac{VOUT}{VIN} = \frac{1}{F}$$

The transformation factor F is equal or higher than 1. The duty cycle D is equal or less than 1. The reason is that the operating mode of the voltage converter 10 is a buck or step-down conversion.

In the second phase B, the first FET 24 is connected so that the first FET 24 is in the diode mode. This can be reached very efficiently by putting the control terminal of the first FET 24 to the ground potential GND or, alternatively, to a reference voltage and the bulk of the first FET 24 to a minimum voltage, where the second FET 32 is in a blocking state, after the second FET 32 was in a conducting state in the previous phase A and there was current saved in the coil 13. The minimum voltage is tapped at the first coil terminal 14. The second duration TB of the second phase B can be very short, but also long if there is need for it. The second phase B is implemented in a phase for the discharging of the coil 13 and charging of the output capacitor 23 during falling of the coil current IL. If a voltage on a pin or terminal that is connected to the first coil terminal 14 is measured during the second phase B, while the coil current IL is discharged, said voltage is negative, for example −1 V, and not 0 V or near 0 V. Said pin obtains the negative value VN of the coil input voltage VLX, while a positive coil current IL flows.

Figure 2B:
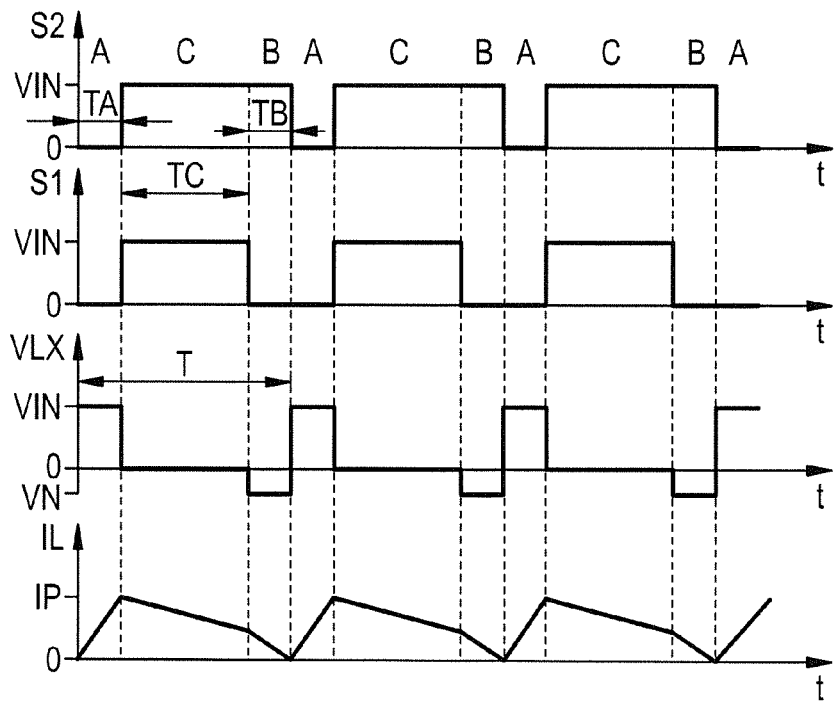

FIG. 2B illustrates the timing of the signals of the voltage converter 10, wherein a cycle comprises the first, the second and the third phase A, B, C. In the third phase C, as already illustrated above, the first and the second control signal S1, S2 obtain the value of the input voltage VIN. Thus, the first switch 15 is in a conducting state and the second switch 17 is in a blocking state during the third phase C. Since the controlled section of the first FET 24 has a very low on-resistance during the third phase C, the converter input voltage VLX is approximately at the ground potential GND or has a slight negative value. The slight negative value may be equal to the product of the coil current IL and the on-resistance of the first FET 24.

In the third phase C, the coil current IL starts at the peak value IP that is achieved at the end of the first phase A. The coil current IL decreases in the third phase C. Since the on-resistance of the first FET 24 is lower in the third phase C in comparison to the second phase B, a steepness of the decrease of the coil current IL in the third phase C is lower than a steepness of the decrease of the coil current IL in the second phase B. The second phase B follows the third phase C. The third phase C follows the first phase A.

If an energy consumption of a load connected to the converter output 12 is approximately equal to the energy provided via the coil 13 to the converter output 12, the peak value IP of the coil current IL is constant as shown at the three cycles of FIG. 2B. In case energy consumption by the load is smaller than the energy provided via the coil 13, the peak value IP will decrease and the coil current IL will become zero before the end of the cycle that is the end of the second phase B.

The duty cycle D and the cycle time T can be calculated according to the following equation, wherein TC is a third duration of the third phase C:

$$D = \frac{TA}{T} \text{ with } T = TA + TB + TC = \frac{1}{fOSC}$$

The operating mode of the voltage converter 10 is a multiphase buck conversion. The voltage converter 10 is a DC/DC buck converter with the n-channel MOSFET 24 connected between the reference potential terminal 16 and the first coil terminal 14. The second phase B is obtained by having the n-channel MOSFET 24 connected as diode during the coil current IL flowing through it. This occurs in a coil discharging phase. The second phase B could be also combined with the n-channel MOSFET 24 connected as switch in the coil discharging phase as shown in FIGS. 2B and 2C. The second phase B may be used if the output voltage VOUT is very low. The falling/rising of the coil current IL is defined as:

$$\frac{dIL}{dt} = \frac{UL}{L} = \frac{VLX - VOUT}{L},$$

wherein dIL/dt is a change in the coil current IL, L is the inductivity of the coil 13 and UL is a voltage (potential difference) between the first coil terminal 14 and the second coil terminal 14'. The voltage UL is equal to the coil input voltage VLX minus the output voltage VOUT. During the coil discharging phase, if the n-channel MOSFET 24 is switched as switch, the coil input voltage VLX gets equal to the ground potential GND (0V) and the voltage UL is −VOUT. This is the case in the third phase C. However, if the n-channel MOSFET 24 is connected as diode as in the second phase B, the coil input voltage VLX gets in minus values (threshold voltage of the first FET 24 plus a overdrive voltage), what is about −1V (dependent on transistor), so the voltage UL is −(VOUT+1V) and it is getting bigger, what means that the change dIL/dt of the coil current IL is bigger, so discharging is much faster. The second duration TB of the second phase B can be implemented for shorter or longer time, as constant time or dependent on some parameter. The second phase B can be implemented in combination with the third phase C or alone.

According to an example, the output voltage VOUT is 1V. In the third phase C, a current falling dIL/dt=−1V/L is achieved; if the second phase B is used, a current falling dIL/dt=−2V/L is obtained, resulting in a double faster discharging. This should be beneficial for example in cases where discharging without the use of the second phase B lasts very long and such a long duration is not intended, for example at a big transformation factor F.

FIG. 2C shows an alternative timing of the signals of the voltage converter 10. The cycle comprises the first, the second and the third phase A, B, C. Contrary to FIG. 2B, the third phase C follows the second phase B which in turn follows the first phase A in FIG. 2C. Thus, the coil current IL, which rises during the first phase A, has a high steepness during the second phase B and a low steepness during the third phase C. The duty cycle D and the cycle time T can be calculated as described above:

$$D = \frac{TA}{T} \text{ with } T = TA + TB + TC = \frac{1}{fOSC}$$

As shown in FIGS. 2B and 2C, the third phase C can be arranged before or after the second phase B.

The phase for the discharging of the coil 13 and charging of the output capacitor 23 during the falling of the coil current IL is named as coil discharging phase and can be realized with the second phase B and the third phase C. The second phase B can be implemented after current is saved in the coil 13, in beginning, on the end of period or in between in combination with the third phase C, or can even be implemented alone for discharging of the coil current IL, as shown in FIGS. 2A to 2C. This is dependent on the required characteristics of an application of the voltage converter 10. In the third phase C, the first switch 15 is in a conducting state reached with putting the input voltage VIN or a similar voltage on the control terminal of the first FET 24.

As shown in FIGS. 2A to 2C, the third phase C can be omitted or used in combination with the second phase B. In the second phase B, the n-channel MOSFET is conducting current as diode. The second phase B is realized in the way that the control terminal of the first FET 24 that is the gate of the first FET 24 is connected to the ground potential GND and the bulk terminal 27 to the most negative voltage that can be tapped in the voltage converter 10, in this case the coil input voltage VLX at the first coil terminal 14. During the second phase B, the coil input voltage VLX drops down to a negative value, for example −1V. So discharging of the coil 13 and falling of the coil current IL is faster as for the third phase C. In this example the duty cycle D reaches the value 0.4 and the output voltage VOUT is four times smaller than the input voltage VIN. The second phase B is especially advantageous in case of a small duty cycle D and a big input to output ratio.

An advantage of the second phase B is the possibility for fast discharging of the coil 13 such that the coil current IL falls faster than in the third phase C, giving more flexibility. For example, if the transformation factor F=VIN/VOUT is big, the time for coil charging is very short leading to a short first duration TA and a very small duty cycle D. This is hard to realize with good stability, because the first duration TA is for example 5 or 10% of the cycle time T, and time for coil discharging is very long, because current falling is slow in the third phase C. The second phase B allows to realize a high transformation factor F.

The flexibility in choosing if the coil 13 is discharged fast or slow gives the possibility to also influence the maximum current IP flowing through the coil 13 so the load capability can be improved. This facilitates the choice of the coil 13. Moreover, the coil 13 can be operated in the optimal region.

In an alternative embodiment, not shown, a cycle comprises a further second phase B' such that the order of the phases is the first phase A, the second phase B, the third phase C and the further second phase B'. In the further second phase B', the first and the second control signal S1, S2, obtain the same values such as in the second phase B.

In an alternative embodiment, not shown, a cycle comprises a further third phase C' such that the order of the phases is the first phase A, the third phase C, the second phase B and the further third phase C'. In the further third phase C', the first and the second control signal S1, S2, obtain the same values such as in the third phase C.

Figure 3:
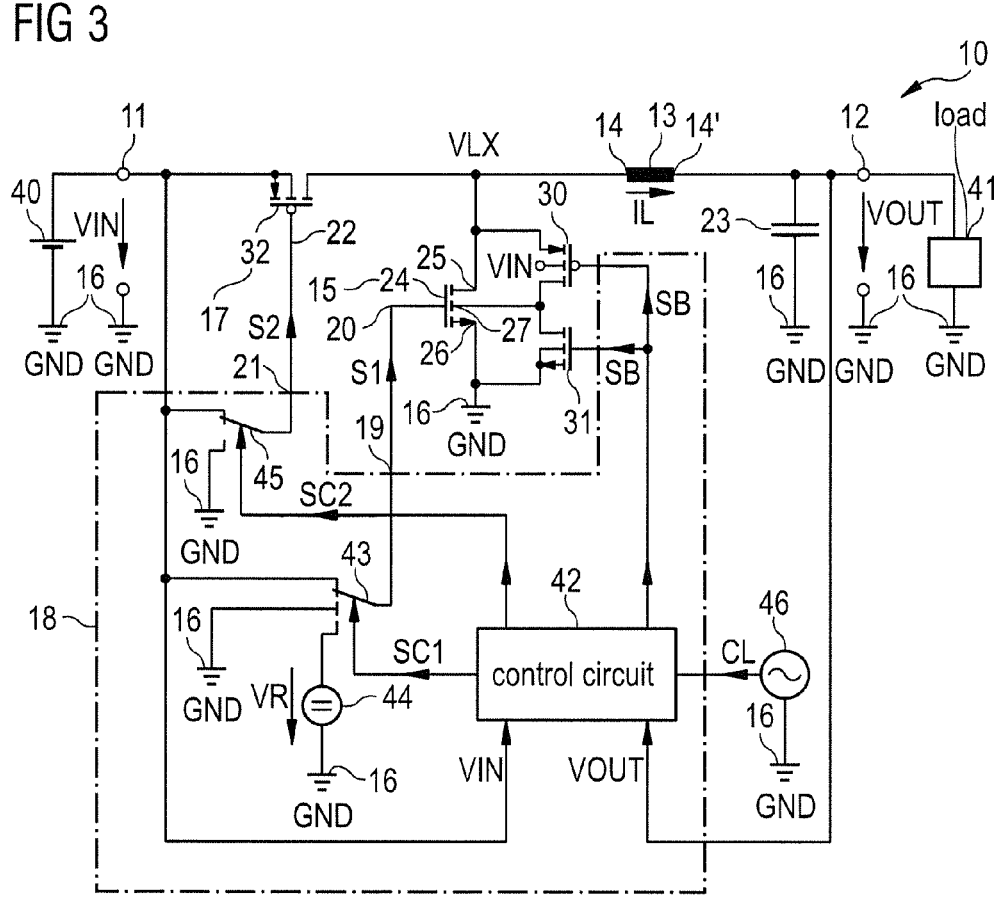
FIG. 3 shows an alternative embodiment of the voltage converter.

FIG. 3 shows an alternative embodiment of the voltage converter 10 that is a further development of the voltage converter shown in FIG. 1A. A battery 40 is connected between the converter input 11 and the reference potential terminal 16. A load 41 is arranged between the converter output 12 and the reference potential terminal 16. The battery 40 provides the input voltage VIN. The output voltage VOUT is provided to the load 41.

The control unit 18 comprises a first changeover switch 43 having an output that is coupled to the control terminal 20 of the first switch 15 and thus to the control terminal of the first FET 24. A control circuit 42 of the control unit 18 is connected on its output side to a control terminal of the first changeover switch 43. The first changeover switch 43 comprises a first input coupled to the converter input 11 and a second input coupled to the reference potential terminal 16. A third input of the first changeover switch 43 is coupled via a reference voltage source 44 to the reference potential terminal 16.

Moreover, the control unit 18 comprises a second changeover switch 45 that is coupled on its output side to the control terminal 22 of the second switch 17 and thus to the control terminal of the second FET 32. The second changeover switch 45 has a first input connected to the converter input 11 and a second input connected to the reference potential terminal 16. The control circuit 42 is connected via a further output to a control terminal of the second changeover switch 45.

A control output of the control circuit 42 is connected to the control terminal of the further FET 30. Additionally, the control output of the control circuit 42 is also connected to the control terminal of the additional FET 31. The further FET 30 is implemented as a p-channel FET. Contrary to that the additional FET 31 is realized as an re-channel FET. The first and the second FET 24, 32, the further FET 30 and the additional FET 31 are designed as MOSFETs. The control circuit 42 is connected on its input side to the converter input 11 and the converter output 12. A clock input of the control circuit 42 is connected to an oscillator 46.

The control circuit 42 provides a first changeover signal SC1 to the control terminal of the first changeover switch 43 and a second changeover signal SC2 to the second changeover switch 45. The reference voltage source 44 provides a reference voltage VR. Thus, the first changeover switch 43 either supplies the input voltage VIN, the ground potential GND or the reference voltage VR to the control terminal 20 of the first switch 15 and thus to the control terminal of the first FET 24 depending on the first changeover signal SC1. The second changeover switch 45 either provides the input voltage VIN or the ground potential GND to the control terminal 22 of the second switch 17 and thus to the control terminal of the second FET 32 depending on the second changeover signal SC2.

The reference voltage VR is applied in the second phase B to the control terminal 20 of the first switch 15 and thus to the control terminal of the first FET 24. A value of the reference voltage VR may be, for example, between the threshold voltage of the first FET 24 and 0 V. Thus, the conductivity of the first FET 24 in the second phase B is increased. The current flow through the first FET 24 is achieved at higher values of the coil input voltage VLX which means that the coil input voltage VLX does only have a small negative value.

Moreover, the control circuit 42 applies the bulk control signal SB to the control terminals of the further FET 30 and the additional FET 31. The bulk control signal SB has a high value, for example the value of the input voltage VIN, in the first and the third phase A, C and a low value, for example the ground potential GND, in the second phase B. Thus, the further FET 30 is set in a blocking state in the first and the third phase A, C and in a conducting state in the second phase B. In contrast, the additional FET 31 is in a conducting state in the first and the third phase A, C and in a blocking state in the second phase B. An identical signal, namely the bulk control signal SB, can be applied to each of the control terminals of the further FET 30 and the additional FET 31. The further FET 30 and the additional FET 31 are not simultaneously in a conducting state.

The control circuit 42 receives the input voltage VIN and the output voltage VOUT. The control circuit 42 determines the first duration TA as a function of the output voltage VOUT. The oscillator 46 provides a clock signal CL. The control circuit 42 receives the clock signal CL having the cycle time T as period. In the operating mode as shown in FIG. 2A, the second duration TB is the cycle time T minus the first duration TA. The control circuit 42 compares the output voltage VOUT with a predetermined value of the output voltage and sets the voltage converter 10 in the operating mode, if the output voltage VOUT is less than said predetermined value. The control circuit 42 sets the voltage converter 10 in an idle mode, if the output voltage VOUT is larger than said predetermined value.

The control circuit 42 adjusts the first and the second changeover switch 43, 45 in such a manner that the voltage converter 10 is set into the operating mode or the idle mode. In the idle mode, the ground potential GND is permanently supplied to the control terminal 20 of the first switch 15 and thus to the control terminal of the first FET 24 by the first changeover switch 43. In the idle mode, the input voltage VIN is permanently provided to the control terminal 22 of the second switch 17 and thus to the control terminal of the second FET 32 by the second changeover switch 45. The first and the second FET 24, 32 are in the blocking state in the idle mode.

In an alternative embodiment, not shown, the reference voltage source 44 is omitted. The first changeover switch 43 comprises exactly two inputs, namely the first input connected to the converter input 11 and the second input connected to the reference potential terminal 16.

Alternatively, the further FET 30 is implemented as n-channel FET. Alternatively, the additional FET 31 is fabricated as p-channel FET.

In an alternative embodiment, not shown, the control circuit 42 is connected via two control outputs to the control terminals of the further FET 30 and the additional FET 31. The control circuit 42 provides the bulk control signal SB to the control terminal of the further FET 30 and the additional bulk control signal SB' to the control terminal the additional FET 31.

I claim:

1. A voltage converter, comprising:
   a converter input to receive an input voltage;
   a coil with a first and a second coil terminal;
   a first switch arranged between the first coil terminal and a reference potential terminal;
   a second switch arranged between the converter input and the first coil terminal;
   a converter output coupled to the second coil terminal for providing an output voltage; and
   a control unit that is connected to a control terminal of the first switch and to a control terminal of the second switch and is configured to set the first switch into a blocking state in a first phase of an operating mode of the voltage converter and into a diode mode in a second phase of the operating mode of the voltage converter and to set the second switch into a conducting state in the first phase and into a blocking state in the second phase,
   wherein the first switch is implemented as a first field-effect transistor having a first output terminal, a second output terminal and a control terminal that is coupled to the control terminal of the first switch, and
   wherein the control unit comprises
      a further field-effect transistor that is arranged between a bulk terminal of the first field-effect transistor and a node between the first coil terminal and the first switch, and
      an additional field-effect transistor that is arranged between the bulk terminal of the first field-effect transistor and the reference potential terminal.

2. The voltage converter according to claim 1, wherein a controlled section of the first field-effect transistor is weakly conducting, when the first switch is set in the diode mode.

3. The voltage converter according to claim 1, wherein a current flows between the second output terminal of the first field-effect transistor and the first output terminal of the first field-effect transistor, when the first switch is set in the diode mode.

4. The voltage converter according to claim 1, wherein the control unit is configured to provide a ground potential that can be tapped at the reference potential terminal to the control terminal of the first field-effect transistor in the second phase.

5. The voltage converter according to claim 1, wherein the control unit is configured to provide a reference voltage to the control terminal of the first field-effect transistor in the second phase.

6. The voltage converter according to claim 1, wherein the control unit is configured to detect a minimum voltage within the voltage converter and to apply said minimum voltage to a bulk terminal of the first field-effect transistor.

7. The voltage converter according to claim 1, wherein the further field-effect transistor is set in a blocking state in the first phase and in a conducting state in the second phase and the additional field-effect transistor is set in a conducting state in the first phase and in a blocking state in the second phase.

8. A voltage converter comprising:
a converter input to receive an input voltage;
a coil with a first and a second coil terminal;
a first switch arranged between the first coil terminal and a reference potential terminal;
a second switch arranged between the converter input and the first coil terminal;
a converter output coupled to the second coil terminal for providing an output voltage; and
a control unit that is connected to a control terminal of the first switch and to a control terminal of the second switch and is configured to set the first switch into a blocking state in a first phase of an operating mode of the voltage converter and into a diode mode in a second phase of the operating mode of the voltage converter and to set the second switch into a conducting state in the first phase and into a blocking state in the second phase,
wherein the control unit is configured to set the first switch into a conducting state in a third phase of the operating mode of the voltage converter and to set the second switch into a blocking state in the third phase, and
wherein the control unit is configured to adjust the first switch such that the first switch has a first value of an on-resistance in the second phase and a second value of the on-resistance in the third phase, and the second value is smaller than the first value.

9. The voltage converter according to claim 8, wherein the third phase follows the second phase that follows the first phase.

10. The voltage converter according to claim 8, wherein the second phase follows the third phase that follows the first phase.

11. The voltage converter according to claim 8, wherein the control unit is configured to set the first switch into a conducting state in a further third phase of the operating mode of the voltage converter and to set the second switch into a blocking state in the further third phase, and wherein the further third phase follows the second phase that follows the third phase that follows the first phase.

12. A method for voltage conversion by a voltage converter, comprising a converter input, a converter output, a coil with a first and a second coil terminal, a first switch arranged between the first coil terminal and a reference potential terminal and a second switch arranged between the converter input and the first coil terminal, the method comprising:
receiving an input voltage at the converter input;
adjusting the first switch into a blocking state in a first phase of an operating mode of the voltage converter and into a diode mode in a second phase of the operating mode of the voltage converter;
adjusting the second switch into a conducting state in the first phase and into a blocking state in the second phase; and
providing an output voltage at the converter output coupled to the second coil terminal,
wherein the first switch is implemented as a first field-effect transistor,
wherein a further field-effect transistor is arranged between a bulk terminal of the first field-effect transistor and a node between the first coil terminal and the first switch, and
wherein an additional field-effect transistor is arranged between the bulk terminal of the first field-effect transistor and the reference potential terminal.

* * * * *